(12) United States Patent
Moroto et al.

(10) Patent No.: US 6,700,281 B2
(45) Date of Patent: Mar. 2, 2004

(54) DC MOTOR AND METHOD OF CONTROLLING THE SAME

(75) Inventors: Kiyonori Moroto, Kariya (JP); Motoya Ito, Hekinan (JP)

(73) Assignee: Denso Corporation, Kariya (JP)

( * ) Notice: Subject to any disclaimer, the term of this patent is extended or adjusted under 35 U.S.C. 154(b) by 25 days.

(21) Appl. No.: 10/100,048

(22) Filed: Mar. 19, 2002

(65) Prior Publication Data

US 2002/0130579 A1 Sep. 19, 2002

(30) Foreign Application Priority Data

Mar. 19, 2001 (JP) ......................................... 2001-78887

(51) Int. Cl.$^7$ .............................................. H02K 23/26
(52) U.S. Cl. ........................ 310/198; 310/234; 310/184
(58) Field of Search .................................. 310/198, 234, 310/184, 165, 158, 173, 174, 179–208, 148, 177, 127–150

(56) References Cited

U.S. PATENT DOCUMENTS

| | | | | |
|---|---|---|---|---|
| 3,733,506 A | * | 5/1973 | Jaffe et al. ................... | 310/198 |
| 4,437,029 A | * | 3/1984 | Ban et al. .................... | 310/198 |
| 5,202,599 A | * | 4/1993 | Kao ............................. | 310/234 |
| 6,160,330 A | * | 12/2000 | Sakamoto ................. | 310/49 R |
| 6,346,756 B1 | * | 2/2002 | Ishikawa et al. .......... | 310/68 B |
| 6,462,429 B1 | * | 10/2002 | Dhyanchand et al. ......... | 290/31 |

FOREIGN PATENT DOCUMENTS

JP            10-341562            12/1998

* cited by examiner

*Primary Examiner*—Karl Tamai
*Assistant Examiner*—Leda T. Pham
(74) *Attorney, Agent, or Firm*—Nixon & Vanderhye P.C.

(57) ABSTRACT

A DC motor includes an armature winding that includes a first coil group of a plurality of phase coils and a second coil group of a plurality of phase coils, a commutator, a brush unit that includes two pairs of brushes and a motor current supply device. The first and second coil groups are connected in series to a DC power source via the commutator and the two pairs of brushes to be supplied with motor current by the motor current control device. Therefore, voltage applied across the brushes and the commutator is reduced, and arc discharge is suppressed.

16 Claims, 5 Drawing Sheets

DC MOTOR AND METHOD OF CONTROLLING THE SAME

CROSS REFERENCE TO RELATED APPLICATION

The present application is based on and claims priority from Japanese Patent Application 2001-78887, filed Mar. 19, 2001, the contents of which are incorporated herein by reference.

BACKGROUND OF THE INVENTION

1. Field of the Invention

The present invention relates to a DC motor.

2. Description of the Related Art

Usually, a fuel pump mounted in an automotive vehicle is driven by a DC motor. Such a DC motor is operated at a fixed speed or controlled by a speed control unit such as a PWM (pulse width modulation) control system.

Generally, as the voltage applied to the DC motor becomes higher, arc discharge is more likely to occur between the brushes and the commutator of the DC motor. As a result, the brushes and the commutator are subject to wear, and the lifetime thereof extremely reduces.

The PWM control system is comprised of a switching element, which is usually turned on or off at a speed as high as 2 kHz or higher, so that power can be supplied to the armature of the DC motor according to a duty ratio of the turn-on time of PWM signals. However, it is necessary to provide a noise filter to suppress an electro magnetic noise. Such a noise filter is usually bulky and expensive because it includes a coil and a capacitor.

SUMMARY OF THE INVENTION

Therefore, the present invention has been made in view of the above problems.

It is a main object of the invention to provide an arc-free DC motor that does not require a noise filter even if controlled by a PWM control system.

According to a feature of the invention, a DC motor includes an armature winding having a first coil group of a plurality of phase coils and a second coil group of a plurality of phase coils, a commutator and a brush unit having two pairs of brushes. In such a DC motor, the first and second coil groups are connected in series to a DC power source via the commutator and the two pairs of brushes to be supplied with motor current. Therefore, the voltage applied to each phase coil is a half as high as the voltage applied to each phase coil of a conventional DC motor that has only a single coil group and a pair of brushes.

As a result, arc discharge is significantly suppressed, so that the lifetime of the brushes can be improved.

According to another feature of the invention, a DC motor includes an armature winding having a first coil group of a plurality of phase coils and a second coil group of a plurality of phase coils, a commutator, and a brush unit including two pairs of brushes, and the first and second coil groups are respectively connected to a DC power source via the commutator and the two pairs of brushes to be alternately supplied with motor current.

Because current is alternately supplied to the first and second coil groups of the DC motor, magnetic noises generated at respective coil groups are cancelled by each other and significantly reduced.

The above DC motor may include a motor current control device that is comprised of a pair of switching elements respectively connected to the first and second coil groups and a PWM current control device for alternately controlling the pair of switching elements.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
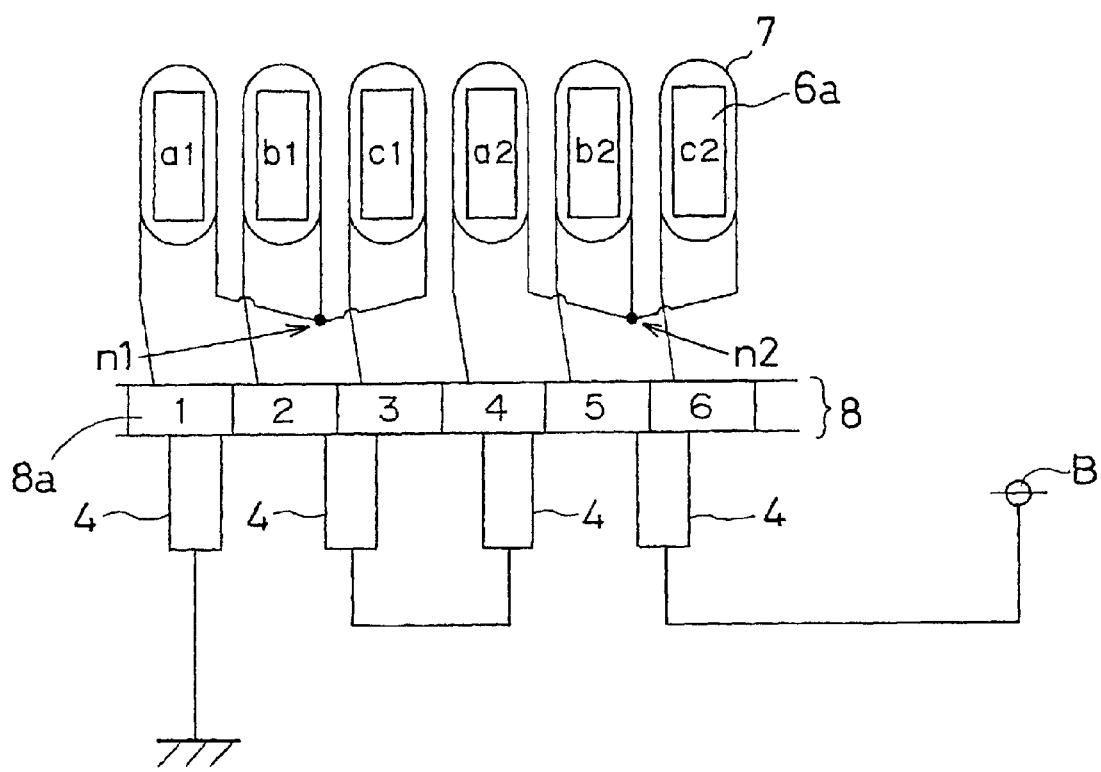
FIG. 1 is a schematic winding diagram of a DC motor according to the first embodiment of the invention.
Figure 2:
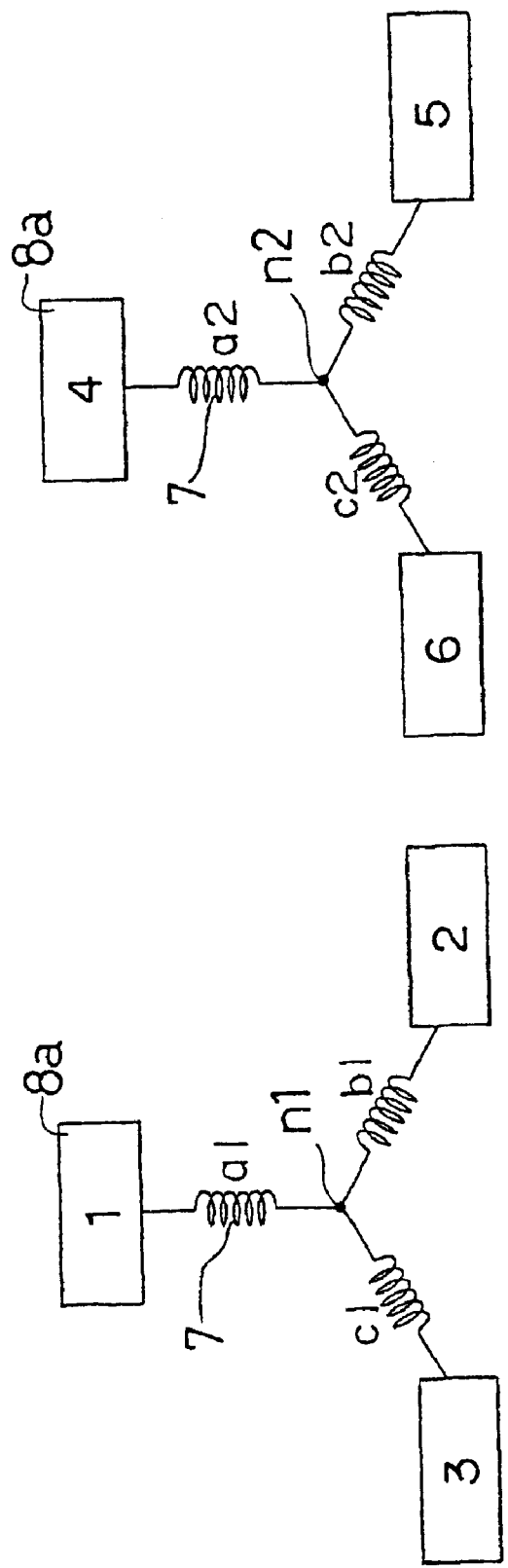
FIG. 2 is a connection diagram of an armature winding of the DC motor according to the first embodiment connected to commutator segments of a commutator of the DC motor.
Figure 3:
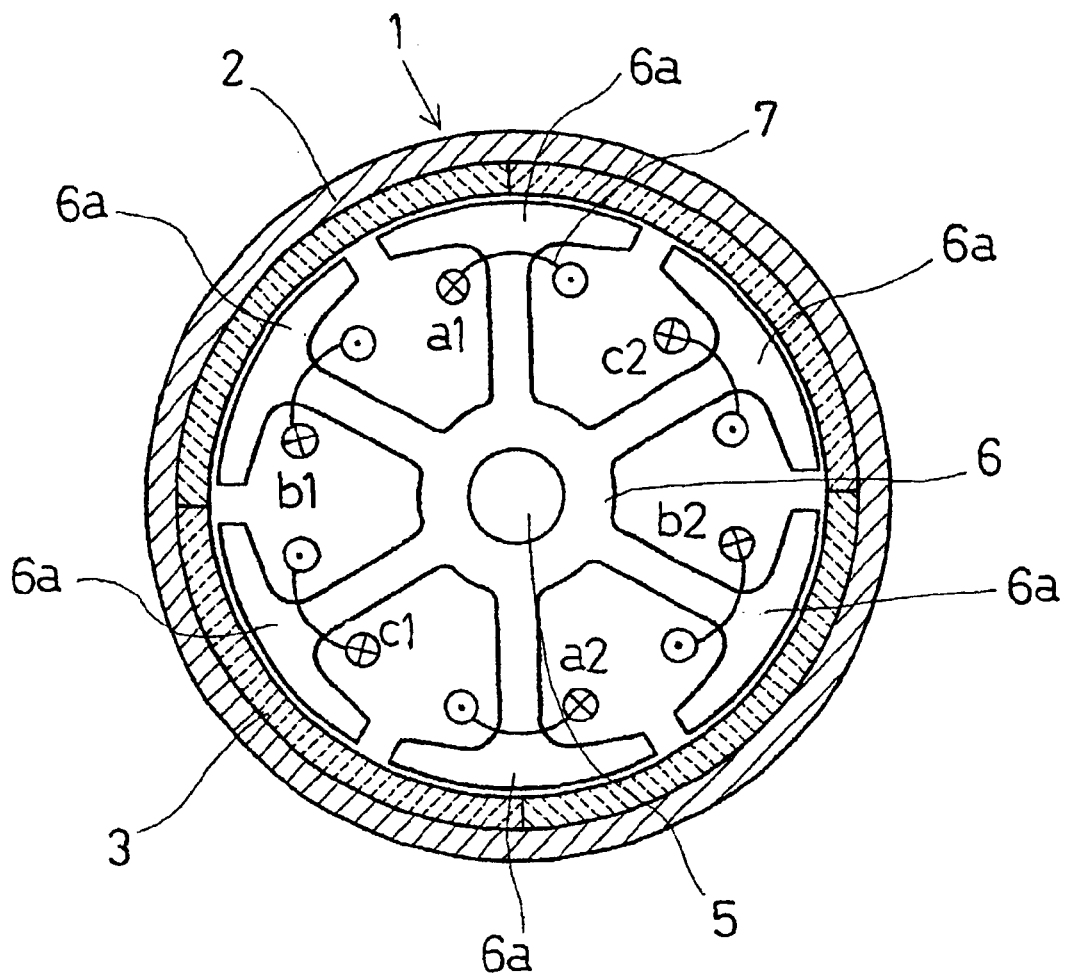
FIG. 3 is a schematic cross-sectional plan view of the DC motor according to the first embodiment.

A DC motor 1 according to the first embodiment of the invention is described with reference to FIGS. 1–3.

The DC motor 1 is mounted in a motor driven fuel pump. As shown in FIG. 3, the DC motor 1 is comprised of a cylindrical yoke 2, a plurality of permanent magnets 3 that is fixed to the inner surface of the yoke 2, a rotor that is rotatably supported inside the permanent magnets 3 and two pairs of brushes 4.

The yoke 2 functions as a magnetic passage and a motor housing. Four permanent magnets 3 are disposed in the circumferential direction of the yoke 2 and magnetized into N or S so that adjacent two are different in polarity from each other. The armature rotor is comprised of a rotary shaft 5, an armature core 6, an armature winding 7 and a commutator 8.

The armature core 6 has six teeth 6a, and the commutator 8 is comprised of six commutator segments 8a that are insulated from each other. The armature winding 7 is comprised of six phase coils a1, b1, c1, a2, b2 and c2, each of which is wound around one of the teeth 6a. One end of each phase coil a1, b1, c1, a2, b2 or c2 is connected to a commutator segment 8a of the commutator 8. The other end of the phase coils a1, b1 and c1 is connected together to form a neutral point n1, and the other end of the phase coils a2, b2 and c2 is connected together to form a neutral point n2, as shown in FIGS. 1 and 2. In other words, the armature winding 7 is comprised of two Y-connected coil groups, a first coil group a1, b1 and c1, and a second coil group a2, b2 and c2, as shown in FIG. 2.

The two pairs of brushes 4 are disposed to be in contact with the commutator surface of the commutator 8 and connected so that the first and second coil groups are connected in series via the two pairs of brushes 4 and the commutator 8. For this purpose, the negative side of a pair of brushes is connected to a ground or a negative side of the battery, the positive-side brush of the pair is connected to the positive side brush of the other pair, and the negative side brush of the other pair is connected to a positive side of the battery B. Accordingly, the voltage applied to each phase coil is a half as high as a voltage applied to each phase coil of a conventional DC motor that has only a single coil group and a pair of brushes. As a result, arc discharge is significantly suppressed, so that the lifetime of the brushes can be improved.

Figure 4:
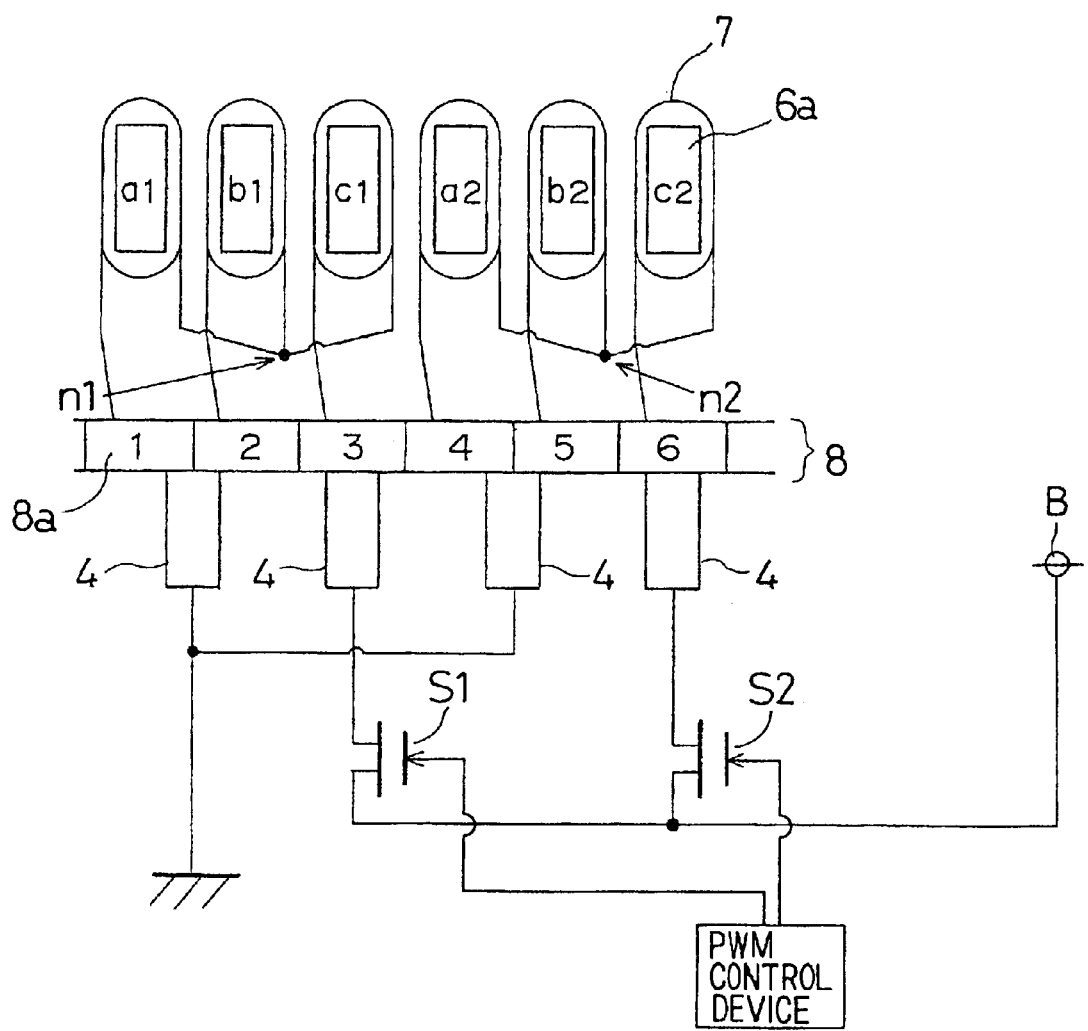
FIG. 4 is a schematic winding diagram of a DC motor according to the second embodiment of the invention.

A DC motor 1a according to a second embodiment of the invention is described with reference to FIG. 4. In the meantime, the same reference numeral represents the same or substantially the same part, portion or component as the DC motor according to the first embodiment.

The DC motor 1 is comprised of a cylindrical yoke 2, four permanent magnets 3 that is fixed to the inner surface of the yoke 2, a rotor that is rotatably supported inside the permanent magnets 3 and two pairs of brushes 4.

Figure 5:
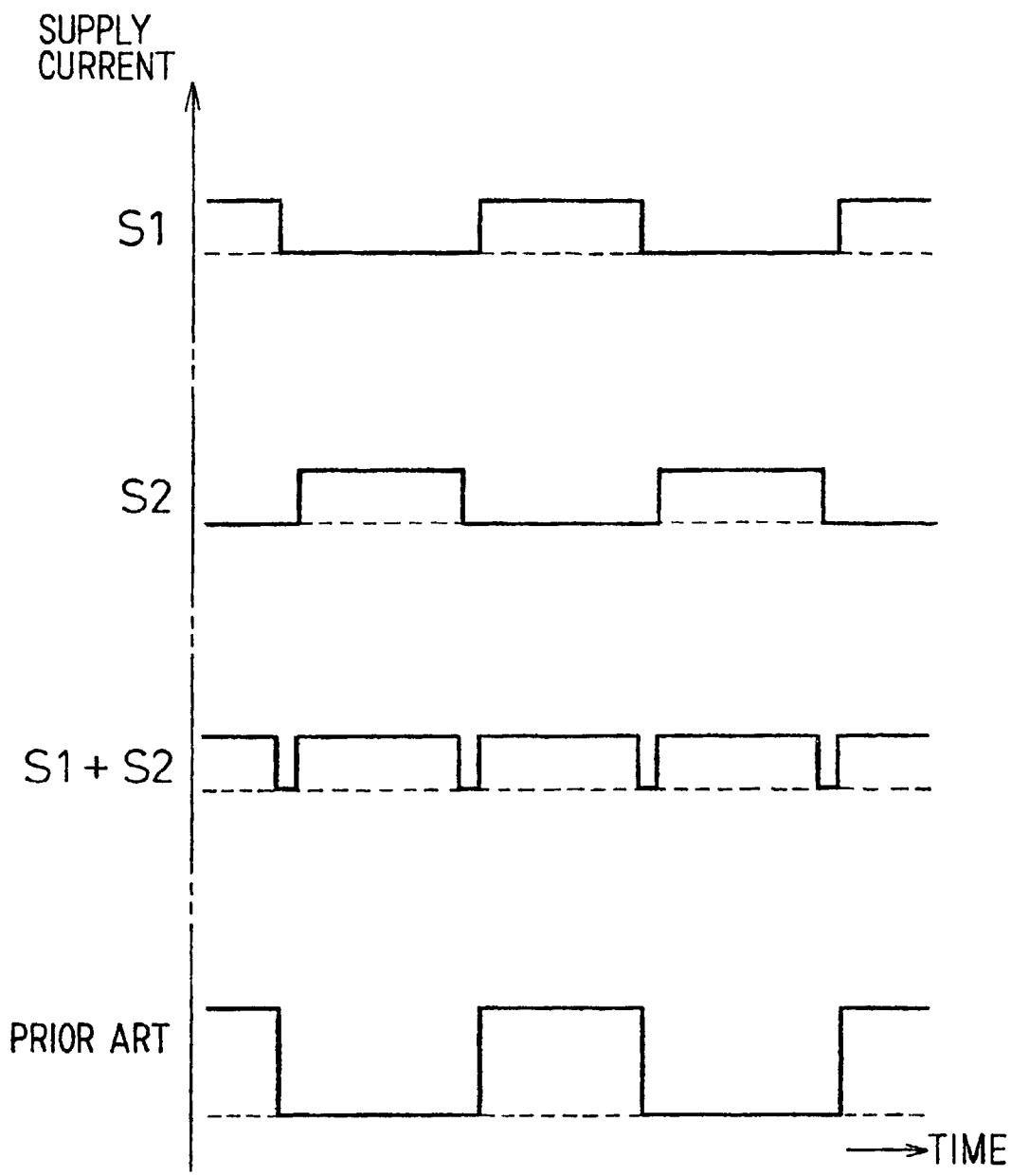
FIG. 5 is a graph showing wave shapes of current supplied to the armature winding of the DC motor according to the second embodiment.

The four permanent magnets 3 are magnetized in the same manner as the first embodiment. The armature core 6 has six teeth 6a, and the commutator 8 is comprised of six commutator segments 8a that are insulated from each other. As is the first embodiment, the armature winding 7 is comprised of six phase coils a1, b1, c1, a2, b2 and c2, each of which is wound around one of the teeth 6a. One end of each phase coil a1, b1, c1, a2, b2 or c2 is connected to a commutator segment 8a of the commutator 8. The other end of the phase coils a1, b1 and c1 is connected together to form a neutral point n1, and the other end of the phase coils a2, b2 and c2 is connected together to form a neutral point n2, in the same manner as the first embodiment. The DC motor 1a has two pairs of brushes 4 that are connected in parallel with each other and two switching elements S1 and S2 respectively connected to the positive side brushes of the two pairs. Therefore, a pair of brushes 4 is connected to the positive terminal and the ground terminal of the battery B separately from the other pair, so that the first coil group a1, b1 and c1 and the second coil group a2, b2 and c2 are separately powered from the battery B via a pair of switching elements S1 and S2. The switching elements S1 and S2 are alternately controlled by a PWM control device, as shown in FIG. 5. The duty ratio (e.g. 50% as shown in FIG. 5) of the PWM signal is changed to control the rotation speed of the motor 1a.

Because the current supplied to the DC motor 1a is approximately a half of the current supplied to a conventional DC motor that has only a pair of brushes, as shown in FIG. 5, magnetic noise can be reduced. In addition, because the two coil groups are alternately powered, high frequency components are cancelled by each other, so that the magnetic noise can be further reduced.

Although the DC motor 1 that has four magnetic poles, 6 slots and two pairs of brushes is described, the present invention can be applied to various type DC motors, such as a DC motor having 6 poles, 9 slots and three pairs of brushes 4.

The DC motors according to the first and second preferred embodiments have almost the same structure except for the structure for connecting the brushes 4 and the battery B. However, a connection structure that is common to the first and second embodiments can be easily provided in a well known manner. Therefore, the same DC motor unit manufactured according to the invention can be readily provided for different purpose, as described above.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A DC motor powered by a DC power source comprising:
   a yoke;
   an armature core having a plurality of teeth and disposed in said yoke;
   an armature winding including a first coil group of a plurality of phase coils connected to form a first neutral point and a second coil group of a plurality of phase coils connected to form a second neutral point, each phase coil being wound around one of said teeth;
   a commutator connected to an end of each said phase coil; and
   a brush unit including two pairs of brushes disposed in contact with said commutator;
   wherein said first and second coil groups are connected in series to said DC power source via said commutator and said two pairs of brushes and supplied with motor current.

2. The DC motor as claimed in claim 1, further comprising a switching element connected in series to said first and second coil groups and a PWM control device for controlling said switching element.

3. The DC motor as claimed in claim 1, wherein one brush of one pair of said two pairs of brushes is directly connected to one brush of the other pair of brushes.

4. The DC motor as claimed in claim 5, wherein only a portion of coils of said first and second coil groups is supplied with current at the same time.

5. A DC motor comprising:
   a yoke;
   an armature core having a plurality of teeth and disposed in said yoke;
   an armature winding including a first coil group of a plurality of phase coils connected to form a first neutral point and a second coil group of a plurality of phase coils connected to form a second neutral point, each phase coil being wound around one of said teeth;
   a commutator connected to an end of each said phase coil;
   a brush unit including two pairs of brushes disposed in contact with said commutator; and
   a motor current control device;
   wherein said first and second coil groups are respectively connected to said DC power source by said two pairs of brushes so that said first and second coil groups can be alternately supplied with motor current by said motor current control device.

6. The DC motor as claimed in claim 5, wherein
   said motor current control device comprises a pair of switching elements respectively connected to said first and second coil groups and a PWM control device for alternately controlling said pair of switching elements.

7. The DC motor as claimed in claim 5, wherein one pair of said brushes is connected to said DC power source separately from the other pair of said brushes.

8. The DC motor as claimed in claim 5, further comprising a current supply for supplying said first coil group current at one time and second coil group with current at another time.

9. The DC motor as claimed in claim 5, wherein only a portion of coils of said first and second coil groups is supplied with current at the same time.

10. A DC motor powered by a DC power source comprising:

a yoke;

an armature core having six teeth and disposed in said yoke;

an armature winding including a first coil group of three phase coils connected to form a first neutral point and a second coil group of three phase coils connected to form a second neutral point, each phase coil being wound around one of said teeth;

a commutator having six commutator segments, each commutator segment being connected to an end of one of said phase coils;

a brush unit including two pairs of brushes disposed in contact with two pairs of said six commutator segments; and a motor current control device;

wherein said first and second coil groups are connected in series to said DC power source via said commutator segments and said two pairs of brushes and supplied with motor current by said motor current control device.

11. A DC motor powered by a DC power source comprising:

a yoke;

an armature core having six teeth and disposed in said yoke;

an armature winding including a first coil group of three phase coils connected to form a first neutral point and a second coil group of three phase coils connected to form a second neutral points, each phase coil being wound around one of said teeth;

a commutator having six commutator segments, each commutator segment being connected to an end of one of said phase coils;

a brush unit including two pairs of brushes disposed in contact with two pairs of said six commutator segments; and a motor current control device;

wherein said first and second coil groups are respectively connected to said DC power source via said two pairs of commutator segments and said two pairs of brushes to be separately supplied with motor current by said motor current control device.

12. A DC motor powered by a DC power source comprising:

a yoke;

an armature core having a plurality of teeth and disposed in said yoke;

an armature winding including a plurality of coil groups of a plurality of phase coils connected to form a second neutral points, each phase coil being wound around one of said teeth;

a commutator connected to an end of each said phase coil;

a brush unit including as many pairs of brushes as said plurality of coil groups disposed in contact with said commutator; and a motor current control device;

wherein said plurality of coil groups is connected in series to said DC power source via said commutator and said brushes and supplied with motor current by said motor current control device.

13. A DC motor comprising:

a yoke;

an armature core having a plurality of teeth and disposed in said yoke;

an armature winding including a plurality of coil groups of a plurality of phase coils connected to form a second neutral points, each phase coil being wound around one of said teeth;

a commutator connected to an end of each said phase coil;

a brush unit including as many pairs of brushes as said plurality of coil groups in contact with said commutator; and a motor current control device;

wherein said plurality of coil groups is respectively connected to said DC power source by said brushes so that said plurality of coil groups can be alternately supplied with motor current by said motor current control device.

14. A DC motor comprising:

a yoke;

an armature core having a plurality of teeth and disposed in said yoke;

an armature winding including a plurality of coil groups of a plurality of phase coils connected to form a second neutral points, each phase coil being wound around one of said teeth;

a commutator connected to an end of each said phase coil; and a brush unit including as many pairs of brushes as said plurality of coil groups in contact with said commutator;

wherein said plurality of coil groups are connected in series with each other via said brushes and supplied with motor current.

15. A DC motor comprising:

a yoke;

an armature core having a plurality of teeth and disposed in said yoke;

an armature winding including a plurality of coil groups of a plurality of phase coils connected to form a second neutral points, each phase coil being wound around one of said teeth;

a commutator connected to an end of each said phase coil; and a brush unit including as many pairs of brushes as said plurality of coil groups in contact with said commutator;

wherein said plurality of coil groups are alternately supplied with motor current.

16. A DC motor powered by a power source comprising:

a yoke;

an armature core having a plurality of teeth and disposed in said yoke;

an armature winding including a plurality of coil groups of a plurality of phase coils connected to form a second neutral points, each phase coil being wound around one of said teeth;

a commutator connected to an end of each said phase coil; and a brush unit including as many pairs of brushes as said plurality of coil groups in contact with said commutator; and means for selectively connecting said plurality of pairs of brushes to said power source so that said coil groups can be connected in series or in parallel to said power source.

* * * * *